US006883915B2

(12) United States Patent
Ye et al.

(10) Patent No.: US 6,883,915 B2
(45) Date of Patent: Apr. 26, 2005

(54) CONTACT LENSES WITH OFF-CENTER SPHERE SURFACE

(75) Inventors: Ming Ye, Fort Worth, TX (US); Curtis Dean McKenney, Duluth, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/364,736

(22) Filed: Feb. 11, 2003

(65) Prior Publication Data

US 2003/0160941 A1 Aug. 28, 2003

Related U.S. Application Data

(60) Provisional application No. 60/356,954, filed on Feb. 14, 2002.

(51) Int. Cl.[7] .................................................. G02C 7/04

(52) U.S. Cl. .................................. 351/160 R; 351/177

(58) Field of Search ............................ 351/159, 160 R, 351/160 H, 161–162, 177; 451/42–43, 240, 255–256, 277, 323, 325, 390; 264/2.7

(56) References Cited

U.S. PATENT DOCUMENTS 4,580,882 A * 4/1986 Nuchman et al. ........... 351/161
4,765,728 A 8/1988 Porat et al. ............. 351/160 R
5,684,560 A 11/1997 Roffman et al. ........ 351/160 R
5,691,797 A * 11/1997 Seidner et al. .............. 351/161
5,815,239 A 9/1998 Chapman et al. ........... 351/177
6,099,121 A 8/2000 Chapman et al. ....... 351/160 H
6,183,082 B1 2/2001 Clutterbuck ............ 351/160 R
6,206,520 B1 3/2001 Jubin et al. ............. 351/160 R
6,270,218 B1 8/2001 Clutterbuck ............ 351/160 R
6,404,183 B1 6/2002 Piana ......................... 351/161
6,419,359 B2 * 7/2002 Edwards ..................... 351/177
6,457,826 B1 * 10/2002 Lett ........................... 351/161
2002/0159025 A1 * 10/2002 Legerton et al. ........ 351/160 R

FOREIGN PATENT DOCUMENTS

GB 607641 2/1947 ...................... 97/1
GB 905289 9/1959 ...................... 97/1

* cited by examiner

*Primary Examiner*—Jordan M. Schwartz
*Assistant Examiner*—Jessica Stultz
(74) *Attorney, Agent, or Firm*—Jian Zhou; Robert J. Gorman; R. Scott Meece

(57) ABSTRACT

The present invention provides a contact lens comprising a convex surface and a concave surface, one or both of the surfaces comprising: a) a central optical zone that is an aspherical sub-surface; b) a transition zone that is adjacent to said central optical zone, wherein and is a rotationally symmetric off-center sphere sub-surface; and c) a peripheral zone that comprises one or more sphere sub-surfaces, wherein all sub-surfaces are tangent to each other. By having a transition zone of the present invention, flexion points at the junction of optical zone with peripheral zone can be eliminated. The present invention also provides a method for producing a contact lens of the present invention.

17 Claims, 2 Drawing Sheets

CONTACT LENSES WITH OFF-CENTER SPHERE SURFACE

This application claims benefit under 35 U.S.C. § 119 (e) of the filing date of the provisional U.S. patent application having Ser. No. 60/356,954, filed on Feb. 14, 2002, which is hereby incorporated by reference.

This invention is related to contact lenses. In particular, the present invention is related to contact lenses each of which has a convex (front) surface and a concave (back) surface, on one or both of the surfaces the first derivative is continuous from the center to the edge.

BACKGROUND

It is well known that contact lenses can be used for cosmetics and the correction of visual acuity. The ideal contact lens is one which is not only comfortable to wear for extended periods of time, but also easily manufactured at minimum cost in time and labor.

Generally, the front, or convex, surface of a contact lens comprises an optic zone, one or more peripheral zones that are adjacent to the optical zone, and an edge, wherein the peripheral zones are typical sphere surfaces. The presence of all but the optic zone is necessitated by the need for the contact lens to fit comfortably, for the lens to position itself correctly on the wearer's eye, and for the lens to be easily handled by the lens wearer.

However, where the optical zone is an aspherical surface, the use of one or more peripheral zones that are adjacent to the optical zone is problematic. For example, the peripheral zone forms a junction with the optical zone, which may comprises flexion points at the junction. Such flexion points may result in differential pressure on the wearer's eye and therefore may have adverse effects on the comfort and ocular health. Therefore, there is a need for a contact lens that overcomes some or all of these disadvantages and can be easily manufactured at minimum cost in time and labor.

SUMMARY OF THE INVENTION

In one embodiment, the present invention provides a contact lens comprising a convex surface and a concave surface, one or both of the surfaces comprising: a) a central optical zone that is an aspherical sub-surface; b) a transition zone that is adjacent to said central optical zone, wherein and is a rotationally symmetric off-center sphere sub-surface; and c) a peripheral zone that comprises one or more sphere sub-surfaces, wherein all sub-surfaces are tangent to each other.

In another embodiment, the present invention provides a series of contact lenses comprising contact lenses having different power corrections, wherein each contact lens in the series has at least one surface comprising: a) a central optical zone that is an aspherical sub-surface, b) a transition zone that is adjacent to said central optical zone, wherein the transition zone is a rotationally symmetric off-center sphere sub-surface; and c) a peripheral zone that comprises one or more sphere sub-surfaces, wherein all sub-surfaces are tangent to each other.

In a further embodiment, the present invention provides a method for producing a contact lens, the method comprising the steps of providing a convex surface and a concave surface, one or both of the surfaces comprising: a) a central optical zone that is an aspherical sub-surface; b) a transition zone that is adjacent to said central optical zone, wherein the transition zone is a rotationally symmetric off-center sphere sub-surface; and c) a peripheral zone that comprises one or more sphere sub-surfaces, wherein all sub-surfaces are tangent to each other.

DETAILED DESCRIPTION OF THE PREFERRED EMBODIMENTS

Figure 1:
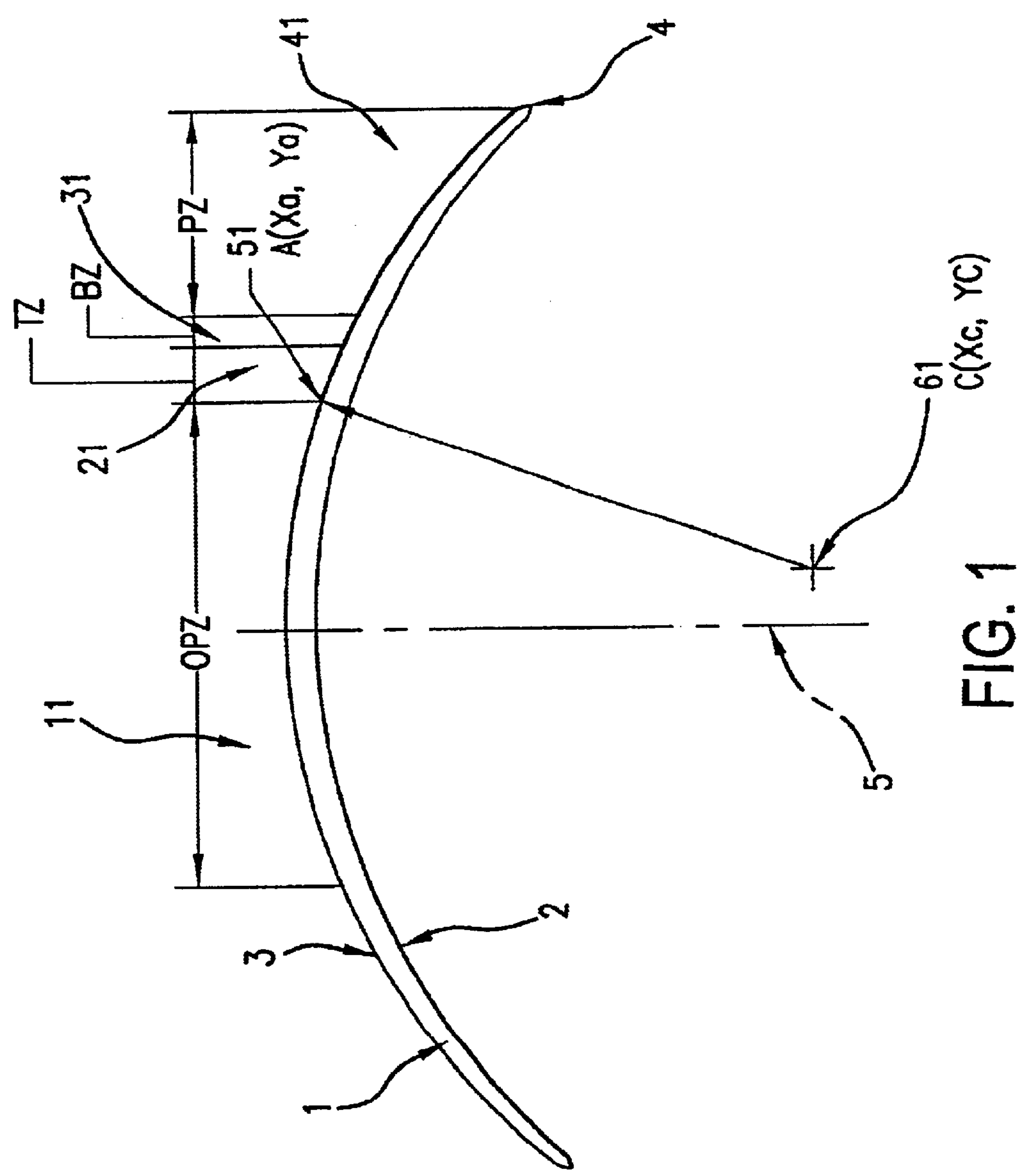
FIG. 1 illustrates schematically a sectional view of a representative contact lens.
Figure 2:
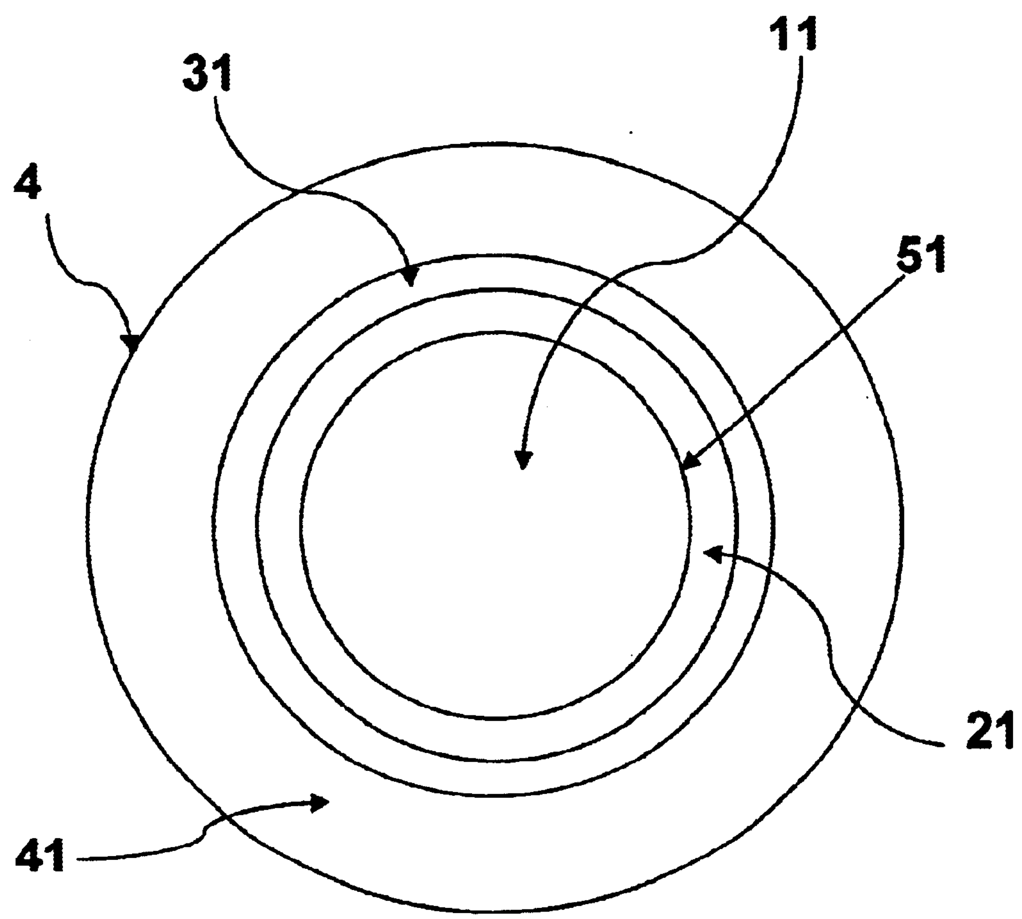
FIG. 2 illustrates schematically a top view of the representative contact lens shown in FIG. 1.

With reference to FIGS. 1–2, contact lens 1 has a concave (or back) surface 2, a convex (or front) surface 3 meeting at edge 4, and an axis 5 passing through the apex of the convex surface 3. Convex surface 3 comprises central optical zone 11, transition zone 21, blend zone 31, and peripheral zone 41.

Central optical zone 11 may be an aspherical surface, such as conic, polynomial, or the like. Preferably, central optical zone is an aspherical optical surface that can be described by a function form of:

$$y_{opz} = \frac{x^2}{r\left(1 + \sqrt{1 - \frac{1+\kappa}{r_0^2}x^2}\right)} \text{ or } y_{opz} = a_0 + a_1 x + a_2 x^2 + \ldots + a_n x^n \tag{1}$$

wherein $r_0$ is the radius at the apex of the aspherical sub-surface, κ is a conic constant, $a_0 \ldots a_n$ are coefficient constants. The precise geometry is selected to correspond to the lens' wearer's required prescriptive power.

The optical zone of the concave surface 2 of lens 1 may be of any desired geometry, such as a toric, or cylindrical, surface centered about a toric axis that corrects for the wearer's astigmatism. As known in the art, the front central zone and back central zone combine to provide the lens with a given refractive correction.

The transition zone 21 is a rotationally symmetric off-center sphere surface. The radius $r_a$ of the rotationally symmetric off-center sphere surface can be calculated by the formula:

$$r_a = \frac{\{1 + [y'_{opz}(x_a)]^2\}^{3/2}}{y''_{opz}(x_a)}, \tag{2}$$

wherein $y_{opz}(x_a)$ is the $1^{st}$ derivative of the aspherical function form (1) at a junction point 51 $A(x_a,y_a)$ of the transition zone 21 with the central optical zone 11, $y_{opz}(x_a)$ is the $2^{nd}$ derivative of the aspherical function form (1) at the junction point 51 $A(x_a,y_a)$. The center $C(x_c,y_c)$ of the curvature radius $r_a$ can be calculated by formula (3) and (4)

$$x_c = x_a - \frac{y'_{opz}(x_a)\cdot\{1 + [y'_{opz}(x_a)]^2\}}{y''_{opz}(x_a)} \tag{3}$$

$$y_c = y_a - \frac{\{1 + [y'_{opz}(x_a)]^2\}}{y''_{opz}(x_a)} \tag{4}$$

By using function forms 1–4, the generated transition zone 21 is tangent to the central optical zone at point A 51.

Peripheral zone 41 can be a sphere surface or multiple spheres surfaces with fillet between two neighboring sphere surfaces.

By adding a transition zone, which is a rotationally symmetric off-center sphere surface, any flexion point at the junction of the central optical zone with the transition zone can be eliminated. Therefore, it can be ensured that all surfaces of the convex surface are tangent to each other, i.e., the first derivative is continuous on the convex surface from the center (apex) to the edge.

Another advantage of adding a transition zone of the invention is the simplicity for implementing it in the lens design and manufacturing. It should be understood that by using a complex mathematical function, such as spline, one can also ensure all sub-surfaces of the convex surface of a contact lens are tangent to each other. However, the incorporation of complex mathematical functions in the lens design is likely to increase the cost of manufacturing.

The transition zone of the invention can also be incorporated in the concave surface of a contact lens or in both the convex and concave surfaces of a contact lens.

Contact lenses useful with the transition zone of the invention may be either hard or soft lenses. Soft contact lenses, made of any material suitable for producing such lenses, preferably are used. The lenses of the invention may have any of a variety of corrective optical characteristics incorporated onto the surfaces. For example, the lens may have any one or more of spheric, aspheric, bifocal, multifocal, prismatic, or cylindric corrections. These corrections may be on either or both the convex or concave surface. For example, the lens of the invention is a toric soft contact lens, meaning that the contact has a cylindrical optical surface, or power, to correct for the wearer's astigmatism.

Contact lenses can now be manufactured that incorporate the transition zone into at least one of the lens surfaces. Contact lenses of the invention may be produced by any convenient means. Preferably, contact lenses are molded from contact lens molds including molding surfaces that replicate the contact lens surfaces when a lens is cast in the molds. For example, an optical cutting tool with a numerically controlled lathe may be used to form a metallic optical tool incorporating the rotationally symmetric off-center sphere surface of the invention. The tool is then used to make convex surface molds that are then used, in conjunction with concave surface molds, to form the lens of the invention using a suitable liquid lens-forming material placed between the molds followed by compression and curing of the lens-forming material. Accordingly, contact lenses according to the invention can be manufactured by providing contact lens molds having a molding surface that comprises: a) a central optical zone that is an aspherical sub-surface; b) a transition zone that is adjacent to said central optical zone, wherein and is a rotationally symmetric off-center sphere sub-surface; and c) a peripheral zone that comprises one or more sphere sub-surfaces, wherein all sub-surfaces are tangent to each other.

It will be understood by those of ordinary skill in the art that various other changes of the details of the invention described may be made. Such changes are intended to be included within the scope of the invention claimed.

What is claimed is

1. A contact lens comprising a convex surface and a concave surface, one or both of the surfaces comprising:

(a) an apex;

(b) an axis passing through the apex;

(c) a central optical zone that is an aspherical sub-surface described by an aspherical function form $y_{opz}(x)$;

(d) a transition zone that is adjacent to and surrounds said central optical zone, wherein said transition zone is a rotationally symmetric off-center sphere sub-surface characterized by having a curvature radius $r_a$ the center $C(x_c,y_c)$ of which is not located in the axis, wherein said curvature radius $(r_a)$ is defined by a functional form (2)

$$r_a = \frac{\{1 + [y'_{opz}(x_a)]^2\}^{3/2}}{y''_{opz}(x_a)}, \tag{2}$$

wherein the center $C(x_c,y_c)$ of the curvature radius $r_a$ is given by formula (3) and (4)

$$x_c = x_a - \frac{y'_{opz}(x_a)\cdot\{1 + [y'_{opz}(x_a)]^2\}}{y''_{opz}(x_a)} \tag{3}$$

$$y_c = y_a - \frac{\{1 + [y'_{opz}(x_a)]^2\}}{y''_{opz}(x_a)} \tag{4}$$

wherein $y'_{opz}(X_a)$ is the 1st derivative of the aspherical function form at a junction point $A(x_a,y_a)$ of the transition zone with the central optical zone, $y''_{opz}(x_a)$ is the 2nd derivative of the aspherical function form at the junction point $A(x_a,y_a)$; and (e) a peripheral zone that comprises one or more sphere sub-surfaces, wherein all sub-surfaces are tangent to each other.

2. A contact lens of claim 1, further comprising a blend zone between said transition zone and said peripheral zone.

3. A contact lens of claim 1, wherein said aspherical function form is equation (1)

$$y_{opz} = \frac{x^2}{r\left(1 + \sqrt{1 - \frac{1+\kappa}{r_0^2}x^2}\right)} \text{ or } y_{opz} = a_0 + a_1x + a_2x^2 + \ldots + a_nx^n \tag{1}$$

wherein $r_0$ is the radius at the apex of the aspherical sub-surface, κ is a conic constant, $a_0, \ldots, a_n$ are coefficient constants.

4. A contact lens of claim 1, wherein said convex surface comprises said central optical zone, said transition zone, and said peripheral zone.

5. A contact lens of claim 1, wherein said concave surface comprises said central optical zone, said transition zone, and said peripheral zone.

6. A contact lens of claim 1, wherein said contact lens is a soft contact lens.

7. A contact lens of claim 1, wherein said peripheral zone comprises multiple sphere sub-surfaces with fillet between two neighboring sphere sub-surfaces.

8. A method of producing a contact lens, comprising the steps of providing a convex surface and a concave surface, one or both of the surfaces comprising:

(a) an apex;

(b) an axis passing through the apex;

(c) a central optical zone that is an aspherical sub-surface described by an aspherical function form form $y_{opz}(x)$;

(d) a transition zone that is adjacent to and surrounds said central optical zone, wherein said transition zone is a rotationally symmetric off-center sphere sub-surface characterized by having a curvature radius $r_a$, the center $C(x_c,y_c)$ of which is not located in the axis, wherein said curvature radius $(r_a)$ is defined by a functional form (2)

$$r_a = \frac{\{1 + [y'_{opz}(x_a)]^2\}^{3/2}}{y''_{opz}(x_a)}, \quad (2)$$

wherein the center $C(x_c,y_c)$ of the curvature radius $r_a$ is given by formula (3) and (4)

$$x_c = x_a - \frac{y'_{opz}(x_a) \cdot \{1 + [y'_{opz}(x_a)]^2\}}{y''_{opz}(x_a)} \quad (3)$$

$$y_c = y_a + \frac{\{1 + [y'_{opz}(x_a)]^2\}}{y''_{opz}(x_a)} \quad (4)$$

wherein $y'_{opz}(x_a)$ is the 1st derivative of the aspherical function form at a junction point $A(x_a,y_a)$ of the transition zone with the central optical zone, $y''_{opz}(x_a)$ is the 2nd derivative of the aspherical function form at the junction point $A(x_a,y_a)$; and (e) a peripheral zone that comprises one or more sphere sub-surfaces, wherein all sub-surfaces are tangent to each other.

9. A method of claim 8, wherein said aspherical function form is equation (1)

$$y_{opz} = \frac{x^2}{r\left(1 + \sqrt{1 - \frac{1+\kappa}{r_0^2}x^2}\right)} \text{ or } y_{opz} = a_0 + a_1x + a_2x^2 + \ldots + a_nx^n \quad (1)$$

wherein $r_0$ is the radius at the apex of the aspherical sub-surface, κ is a conic constant, a0, . . . , an are coefficient constants.

10. A method of claim 8, wherein said convex surface comprises said central optical zone, said transition zone, and said peripheral zone.

11. A method of claim 8, wherein said concave surface comprises said central optical zone, said transition zone, and said peripheral zone.

12. A method of claim 8, wherein said contact lens is a soft contact lens.

13. A series of contact lenses comprising contact lenses having different power corrections, wherein each contact lens in the series comprises a convex surface and a concave surface, one or both of the surfaces comprising:

(a) an apex;

(b) an axis passing through the apex;

(c) a central optical zone that is an aspherical sub-surface described by an aspherical function form form $y_{opz}(x)$;

(d) a transition zone that is adjacent to and surrounds said central optical zone, wherein said transition zone is a rotationally symmetric off-center sphere sub-surface characterized by having a curvature radius $r_a$ the center $C(x_c,y_c)$ of which is not located in the axis, wherein said curvature radius ($r_a$) is defined by a functional form (2)

$$r_a = \frac{\{1 + [y'_{opz}(x_a)]^2\}^{3/2}}{y''_{opz}(x_a)}, \quad (2)$$

wherein the center $C(x_c,y_c)$ of the curvature radius $r_a$ is given by formula (3) and (4)

$$x_c = x_a - \frac{y'_{opz}(x_a) \cdot \{1 + [y'_{opz}(x_a)]^2\}}{y''_{opz}(x_a)} \quad (3)$$

$$y_c = y_a + \frac{\{1 + [y'_{opz}(x_a)]^2\}}{y''_{opz}(x_a)} \quad (4)$$

wherein $y'_{opz}(x_a)$ is the 1st derivative of the aspherical function form at a junction point $A(x_a,y_a)$ of the transition zone with the central optical zone, $y''_{opz}(x_a)$ is the 2nd derivative of the aspherical function form at the junction point $A(x_a,y_a)$; and (e) a peripheral zone that comprises one or more sphere sub-surfaces, wherein all sub-surfaces are tangent to each other.

14. A series of contact lenses of claim 13, wherein said aspherical function form is equation (1)

$$y_{opz} = \frac{x^2}{r\left(1 + \sqrt{1 - \frac{1+\kappa}{r_0^2}x^2}\right)} \text{ or } y_{opz} = a_0 + a_1x + a_2x^2 + \ldots + a_nx^n \quad (1)$$

wherein $r_0$ is the radius at the apex of the aspherical sub-surface, κ is a conic constant, $a_0$ , . . . , $a_n$ are coefficient constants.

15. A series of contact lenses of claim 13, wherein said surface is a convex surface.

16. A series of contact lenses of claim 13, wherein said surface is a concave surface.

17. A series of contact lenses of claim 13, wherein said convex surface comprises said central optical zone, said transition zone, and said peripheral zone.

* * * * *